Patented July 27, 1943

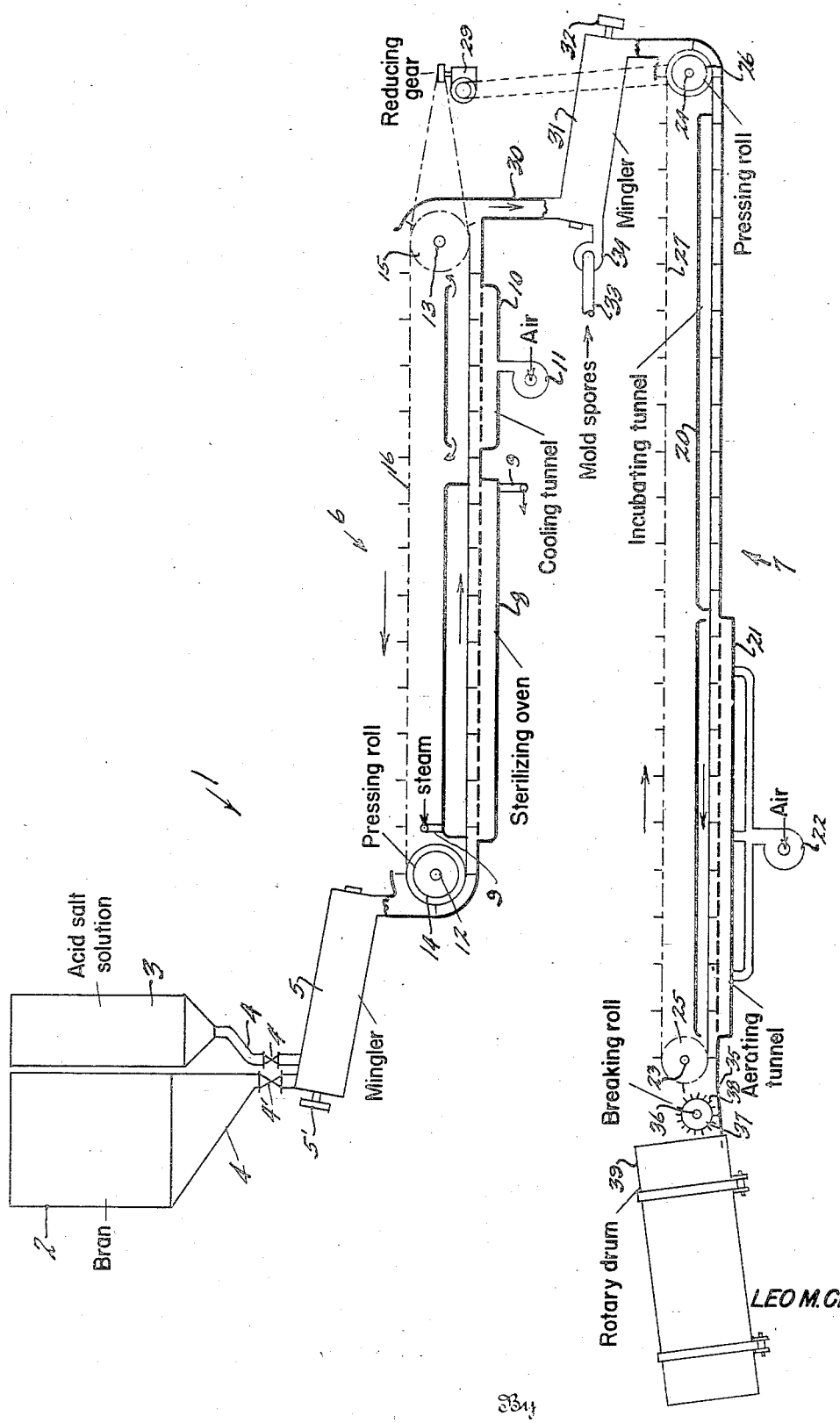

2,325,368

UNITED STATES PATENT OFFICE 2,325,368

APPARATUS FOR PROMOTING MOLD GROWTH

Leo M. Christensen, Moscow, Idaho, assignor to National Agrol Company, Inc., New York, N. Y., a corporation of Delaware Application October 7, 1940, Serial No. 360,205

7 Claims. (Cl. 195—138)

This invention relates generally to a method and apparatus for the production of fermentable carbohydrates from starchy materials, and more especially to a method and apparatus for facilitating the growth of molds on solids substrates of fibrous character to secure diastatic or other enzymic preparations.

In the manufacture of alcohol from starchy materials, it is necessary to convert the starch to fermentable carbohydrates prior to the actual alcoholic fermentation operation. Ordinarily this is accomplished by the use of diastatic material, such as barley malt. However, it is well known that the alcohol yields obtained from carbohydrates converted in this manner have been only about 85% of that theoretically possible from the starchy material employed, and this failure to obtain larger yields has been attributed to the inability of the enzyme system of such diastatic material to convert all of the starch to fermentable carbohydrates.

Moreover, barley malt is unsatisfactory because of its high cost. Since good barley malt must be made from the highest grade barley, and since the process of manufacture requires a long factory operation during which the chance for spoilage of the barley is a serious matter, this cost cannot be reduced and the cost of the manufacture of alcohol is correspondingly increased.

In addition to barley malt, other diastatic preparations have been employed. For example, Takamine (J. Ind. Eng. Chem. 6, 824, 1914) employed a preparation made by growing selected strains of *Aspergillus oryzae* on wheat bran. This is an adaptation of the Japanese method for the manufacture of alcoholic beverages from rice. More recently Fulmer, Underkofler and co-workers (Ind. Eng. Chem. 32,544 (1940) and ibid. 31,734 (1939)) have reported studies using the same type of saccharifying agent. In some cases the mold bran was used as the sole saccharifying agent, while in others it was used in combination with other diastatic materials, such as barley malt, soybeans, or bacterial extracts.

Ordinarily, the mold bran is employed in the same manner as barley malt in saccharification, the bran mold being used in the proportion of one part of bran mold to seven or nine parts of grain on a dry basis. The alcohol yields obtained from grain treated in this manner have been on the average a little better than those secured by the use of average quality barley malt and as good as those secured with the best barley malt. Therefore, the advantage secured in the use of mold bran has been principally derived from the lower cost of diastatic preparation.

Customarily the mold bran is produced by moistening wheat bran with either water or dilute acid, sterilizing the mixture in a suitable pressure vessel, cooling, and then inoculating with the spores of the mold. The material is then placed in an apparatus which is designed to remove the heat produced by the oxidation taking place during the growth of the mold.

Hitherto, for this purpose a tray equipped with a perforated bottom through which air may be introduced if needed or a rotating drum provided with air circulation has been used. Either of these apparatus has been found satisfactory in the production of mold bran in small lots of one hundred pounds or less, but they have been found to be unsatisfactory in large scale operations. For eample, when the tray is employed, the cost of handling the materials and the large number of trays needed has been a serious handicap. On the other hand, if a rotating drum is used, the shearing action involved in the movement of the bran has had a detrimental effect upon the growth of the mold, the newly formed mycelium being torn by the movement of the bran. Moreover, by thus reducing the mold growth, the danger of contaminating the mixture with undesirable bacteria which are not damaged by this mechanical action is likely to have an adverse effect upon the growth of the mold.

The above mentioned difficulties in the production of mold bran in large scale operations has proved a serious handicap in the use of such diastatic materials in the commercial production of alcohol from starchy materials. This accounts for the fact that these materials have only been employed satisfactorily in the laboratory or in small scale operations.

One of the objects of this invention is to avoid the above mentioned difficulties of the prior art.

Another object of this invention is to provide an apparatus designed for facilitating the growth of molds on solid substrates of fibrous material, such as wheat bran, in order to secure diastatic or other enzymic preparations.

Still another object of this invention is to provide an apparatus comprising a table provided with sections designed to facilitate the continuous sterilization, cooling, and inoculation of fibrous material to produce molds.

Yet another object of this invention is to provide a method of growing molds on solid substrates of fibrous character without disturbance of the growth of the mycelium.

A further object of this invention is to provide a method of producing molds on solid substrates of fibrous character by means of which the fibrous material is sterilized, cooled and inoculated and the molds are incubated in a continuous operation.

With these and other objects in view, this invention embraces broadly an apparatus and method for producing mold on fibrous material in large quantities without the necessity for handling present when trays are used and without danger of retarding the growth of the mycelium as is the case when a rotating drum is employed.

In the present process, the sterilization, cooling and inoculation of the bran or other fibrous material and the incubation of the molds is continuous and may be either with or without aeration. Moreover, in this process, by the use of this apparatus higher temperatures can be employed than are usually permissible, thus increasing the rate and amount of mold growth and thereby correspondingly increasing the diastatic value of the end product.

The single sheet of drawings discloses diagrammatically one apparatus which may be used in practicing the process.

In practicing the process, the wheat bran or other fibrous material is mixed with water or preferably with dilute acid to which nutrient salts, such as zinc, copper or iron sulphate, may be added. Although water may be used alone, preferably sufficient water is added to give the bran a moisture content of from 40 to 70%, this water containing sufficient hydrochloric or lactic acid to produce a hydrogen ion concentration of from 4 to 4.2.

The treated bran is then packed loosely in a drag link conveyor on a table which conveys it to a sterilization oven where it is heated to a temperature of from 100 to 110° C. for a period of from thirty to sixty minutes. If desired, a lower temperature and a corresponding longer period of heating may be employed.

The sterilized bran is then conveyed to a cooling section. Ordinarily, fifteen minutes of aeration is sufficient to reduce the temperature of the material to approximately 35° C. The rate of aeration to produce the rate of cooling required to obtain this temperature can be either regulated manually or by thermostatic control.

After approximately fifteen minutes of cooling, the table is moved to another position where the mold spores are added and mechanically mixed by any suitable method with the sterile moist bran. During this operation, the spores may be added in a suspension of water or dilute salt solution if desired but preferably they are added in dry form.

The inoculated bran is then packed into a suitable container, such as a drag link, and is carried over the table through a section which is not equipped for aeration. Preferably, this section is of sufficient length to require twelve hours for the transfer of the inoculated bran over it.

After this period of incubation without aeration, the material is subjected to aeration. The air used may or may not be sterilized or moistened. The required degree of aeration is secured by the use of air under a pressure of about one inch of water.

In order to provide for variations in the bran composition, this pressure may be varied either manually or by thermostatic control to meet the requirements. At this stage it is desirable to maintain a temperature of from 40 to 45° C. although usually the bran will not be damaged until the temperature exceeds approximately 50° C.

The bran is subjected to this incubation period for approximately twelve hours and, after which, the mold mycelium has formed a mat which holds the bran in a solid piece. This formation makes it impossible to maintain a suitable temperature.

For this reason, the bran mold is broken into pieces approximately one inch in diameter and this material is introduced into suitable apparatus, such as a rotating drum or a belt and tunnel unit, provided with adequate air circulation to maintain a suitable temperature. If the bran has dried out excessively, it may be moistened at this point by spraying with water.

The mold bran is aerated in this manner for approximately twenty-four hours when it is ready for use either in its present form or mixed with water to produce a slurry. If desired the product may also be ground. Moreover, if the product is to be stored, it should be dried first in order to prevent deterioration.

The bran mold prepared in the method just described has a higher diastatic value than that made in the tray or drum processes previously described even when small scale operations are employed. For example, amyloclastic values are easily held at higher than twenty in this process as compared with a value of fifteen for mold bran made by the usual tray or rotating drum method. This means that one part of the dry mold bran completely saccharifies at least twenty parts of starch as compared with fifteen for the old method. Moreover, danger of contamination is almost wholly eliminated and the production is practically automatic and continuous.

In order to illustrate an apparatus capable of carrying out this process, I have disclosed in the drawing an apparatus, generally indicated by the numeral 1, which comprises a bran container 2 and a separate container 3 to hold the acid salt solution. These containers are connected by conduits 4, controlled by suitable valves 4', to a mixer 5 where the ingredients are thoroughly mingled by mechanical action. The impeller shaft of the mixer 5 is driven by a pulley 5' from a suitable outside source of power which is not shown. The apparatus 1 is also provided with two tables 6 and 7.

Mounted on the table 6 is a sterilizing oven 8 provided with steam inlet and outlet pipes 9 and a cooling chamber 10 through which chilled air may be forced by a suitable fan 11.

Mounted on opposite extremities of the table 6 are shafts 12 and 13 upon which are rigidly mounted a pressing roll 14 and a carrier roll 15, respectively. These rollers support a continuous link 16 which is driven by an outside source of power through the pressing roll 14. The link 16 is adapted to pass through the oven 8 and chamber 10.

Mounted on the table 7 is an incubating tunnel 20 and an aerating tunnel 21 through which air may be forced by a suitable fan 22. A pair of shafts 23 and 24 are also mounted on opposite extremities of the table 7 and carry rollers 25 and 26, respectively, on which is mounted a continuous drag link 27 which is designed to pass through the tunnels 20 and 21. The continuous link 27 is driven by the roller 26 which in turn is driven through a reduction gear 28 by the roller 15.

The tables 6 and 7 are also connected by a conduit 30 in which is mounted a mingler 31 the impeller blades of which are driven by a pulley 32. The mingler 31 is connected to a source of supply of mold spores by a conduit 33 in which is mounted a fan 34.

Attached to the table 7 adjacent the roller 25 is a platform 35 on which is mounted a shaft 36 which carries a roller 37 provided with crushing grooves 38. The platform 35 also connects the table 7 to a rotary drum 39, the opposite extremity of which empties into a suitable storage container which is not shown. In operation, after the controlled proportions of bran and acid salt solution are thoroughly mixed in the mingler 5 the material passes under the roller 14 where it is tightly packed. It then passes onto the drag link 16 and is slowly carried through the oven 8 in which the temperature has been raised by the use of steam to a range of from 100 to 110° C. Ordinarily the speed of the drag link 16 is regulated so that it requires from thirty to sixty minutes for the material to pass over this section of the table.

From this point the material passes through the cooling chamber 10 where the temperature is reduced to approximately 35° C. Ordinarily this requires approximately fifteen minutes and the material is then conveyed to the end of the table where it is fed by gravity through the conduit 30 to the mingler 31.

At this point the material comes in contact with the mold spores which are blown into the mingler 31 through the conduit 33 by the action of the fan 34. The material is then thoroughly mixed and is gradually forced under the pressing roll 26 upon the drag link 27.

The drag link 27 conveys the material through the incubating tunnel 20. This section is of such length that twelve hours are required for the transfer of the inoculated bran. At this point the aerating tunnel 21 is reached and the material is subjected to aeration, thereby removing the heat generated by oxidation during the growth of the mycelium. During this operation the air is introduced under pressure by the fan 22, the action of which is controlled to provide for variations in the bran composition. This stage also lasts for approximately twelve hours and a temperature of less than 50° C. and preferably between 40 and 45° C. is maintained.

During this period of incubation, a sufficient mat of mycelium is formed to hold the bran in a solid piece. The growth of this material prevents the passage of sufficient air and therefore gradually permits the temperature to rise above the desired level. In order to prevent this accumulation of heat, the material is carried by the link 27 to the platform 35 where it is broken into suitable pieces of approximately one inch in diameter as it passes under the ribbed roller 37 into either the rotary drum 39 or a second tunnel unit for aeration such as the tunnel 21.

After this additional aeration for approximately twenty-four hours, the material is then transferred to a temporary storage space. From this point it is either dried for storing or is used immediately either in its present form or after a further reduction in size by grinding. Moreover, if desired, water may be added and a slurry produced.

While for purposes of illustration I have disclosed one apparatus for practicing the invention, it is obvious that other apparatus may be employed without departing from the scope of the invention. Moreover, variations in the types of nutrient salts added to the bran material and the length of the periods of treatment are contemplated.

It is therefore understood that the invention is to be limited only by the prior art and the scope of the appended claims.

I claim:

1. An apparatus for facilitating the growth of molds on solid substrates of fibrous character comprising a pair of supporting members, a continuous rotatable link, a sterilizing oven, and a cooling tunnel mounted on one of the supporting members, said link being adapted to pass through the said oven and tunnel, an incubating and an aerating tunnel, and a continuous rotatable link mounted on the second supporting member, said link being adapted to pass through the said tunnels, means to rotate the said continuous links, and means operatively connecting the two supporting members to transport the material from the first to the second link.

2. An apparatus for facilitating the growth of molds on solid substrates of fibrous character comprising, a movable link, a sterilizing oven and a cooling tunnel, said link being designed to transport the fibrous material through the said oven and tunnel in the order named, an incubating and aerating tunnel and a second movable link, said link being adapted to transport the fibrous material through the said tunnels in the order named, means to actuate the continuous links, means operatively connecting the said links and designed to transport the material from the first to the second link after it has been transported through the cooling tunnel, and means to inoculate the material with mold spores during its passage from the cooling to the aerating tunnel.

3. An apparatus for facilitating the growth of molds on solid substrates of fibrous character comprising means to mix a fibrous material and a liquid together, and means to promote the growth of mold upon the fibrous material, said second means comprising a link, a sterilizing oven and a cooling tunnel, said link being designed to transport the fibrous material through the said oven and tunnel in the order named, an incubating and aerating tunnel and a second continuous link, said links being adapted to transport the fibrous material through the said tunnels in the order named, a single means to rotate the continuous link, a conduit operatively connecting the said links and designed to transport the material from the first to the second link after it has been transported through the cooling tunnel, and means to inoculate the material with mold spores during its passage through the said conduit.

4. An apparatus for facilitating the growth of molds on solid substrates of fibrous character comprising means to mix a fibrous material and a liquid together, and means to promote the growth of mold upon the fibrous material, said second means comprising a rotatable link, a sterilizing oven and a cooling tunnel, said link being designed to transport the fibrous material through the said oven and tunnel in the order named, an incubating and aerating tunnel and a second continuous link, said link being adapted to transport the fibrous material through the said tunnels in the order named, means to rotate the continuous links, a conduit operatively connecting the said links and designed to transport the material from the first to the second link after it has been transported through the cooling tunnel, means to inoculate the material with mold spores during its passage through the said conduit, and means to reduce the material in size and further aerate the material after it has been transported through the aerating tunnel by the second link, said reducing and aerating means being operatively associated with the second link so as to form a continuous operating unit.

5. An apparatus for facilitating the growth of molds on solid substrates of fibrous character comprising a continuous means to transport the material at a predetermined rate and a series of sections through which the transporting means is designed to carry the material, said sections being designed to sterilize, cool, incubate and aerate the material in the order named, means to provide the proper conditions of temperature and atmosphere to the said sections, and means to inoculate the material with mold spores after it has passed the cooling section and before it has entered the incubating section.

6. An apparatus for facilitating the growth of molds on solid substrates of fibrous character comprising a rotatable link for transporting the fibrous material, a series of enclosed sections through which the link is designed to pass, means designed to provide sterilizing, cooling, incubating, and aerating conditions in the sections in the order named, means between the cooling and the incubating sections to inoculate the material with mold spores and means to actuate the said link.

7. An apparatus for facilitating the growth of molds on solid substrates of fibrous character comprising a movable link, a sterilizing oven and a cooling tunnel, said link being designed to transport the fibrous material through the said oven and tunnel in the order named, and an incubating and aerating tunnel and a second movable link, said link being adapted to transport the fibrous material through the said tunnels in the order named and means to actuate the said links.

LEO M. CHRISTENSEN.